US00RE35078E

United States Patent [19]

Ryan

[11] E Patent Number: Re. 35,078

[45] Reissued Date of Patent: Oct. 31, 1995

[54] METHOD AND APPARATUS FOR ENCRYPTING AND DECRYPTING TIME DOMAIN SIGNALS

[75] Inventor: John O. Ryan, Cupertino, Calif.

[73] Assignee: Macrovision Corporation, Mountain View, Calif.

[21] Appl. No.: 137,582

[22] Filed: Oct. 15, 1993

Related U.S. Patent Documents

Reissue of:

[64] Patent No.: 5,058,157
Issued: Oct. 15, 1991
Appl. No.: 403,514
Filed: Sep. 6, 1989

[51] Int. Cl.[6] ..... H04N 7/167

[52] U.S. Cl. ..... 380/11; 380/20; 380/15; 380/35

[58] Field of Search ..... 380/10, 11, 15, 380/20, 35

[56] References Cited

U.S. PATENT DOCUMENTS

| | | | |
|---|---|---|---|
| 2,547,598 | 4/1951 | Roschke . | |
| 2,619,530 | 11/1952 | Roschke | 380/11 |
| 2,758,153 | 8/1956 | Adler | 380/11 |
| 2,857,455 | 10/1958 | Jollife . | |
| 2,972,008 | 2/1961 | Ridenour . | |
| 3,106,604 | 10/1963 | Shanahon | 380/11 |
| 3,147,061 | 9/1964 | Walker et al. | 380/11 X |
| 3,244,806 | 4/1966 | Morris | 380/11 X |
| 3,538,243 | 11/1970 | Shanahan | 380/20 X |
| 3,732,355 | 5/1973 | Harna et al. | 380/20 |
| 4,070,693 | 1/1978 | Shutterly . | |
| 4,216,500 | 8/1980 | St. Louis . | |
| 4,283,740 | 8/1981 | Okada . | |
| 4,353,088 | 10/1982 | den Toonder et al. . | |
| 4,390,898 | 6/1983 | Bond et al. . | |
| 4,403,252 | 9/1983 | Ragan et al. . | |
| 4,405,942 | 9/1983 | Block et al. . | |
| 4,466,017 | 8/1984 | Banker | 380/20 |
| 4,533,949 | 8/1985 | Fujimura et al. . | |
| 4,547,802 | 10/1985 | Fogarty et al. . | |
| 4,563,702 | 1/1986 | Heller et al. . | |
| 4,568,974 | 2/1986 | den Toonder et al. . | |
| 4,575,754 | 3/1986 | Bar-Zohar . | |
| 4,594,609 | 6/1986 | Romao et al. | 380/20 |
| 4,598,312 | 7/1986 | Geissler et al. . | |
| 4,600,942 | 7/1986 | Field et al. . | |
| 4,604,650 | 8/1986 | DelCoco et al. . | |
| 4,605,961 | 8/1986 | Frederiksen . | |
| 4,736,420 | 4/1988 | Katznelson et al. | 380/20 |
| 4,742,544 | 5/1988 | Kupnicki et al. | 380/20 X |

*Primary Examiner*—Tod R. Swann
*Attorney, Agent, or Firm*—Gerow D. Brill

[57] ABSTRACT

A technique for encrypting and decrypting information signals normally arranged as a succession of lines of active information, with each line having a line timing reference, such as color video information signals. The active video portion is time shifted with respect to the horizontal sync portion of the corresponding line using a predetermined slowly varying time shifting function. The time shifting information is conveyed to the decryption site by encoding the instantaneous value of the time shifting wave form for the beginning of each field in the vertical blanking portion of that field. To provide a reasonable maximum time shifting range, portions of the trailing edge of the active video in the preceding line and portions of the leading edge of the active video in the current line are discarded. During decryption, the original line timing and color burst signals are discarded and new signals are generated which are time displaced from the active video portion by the original amount before encryption.

18 Claims, 10 Drawing Sheets

H- BLANKING
11 μ SEC

METHOD AND APPARATUS FOR ENCRYPTING AND DECRYPTING TIME DOMAIN SIGNALS

Matter enclosed in heavy brackets [ ] appears in the original patent but forms no part of this reissue specification; matter printed in italics indicates the additions made by reissue.

CROSS REFERENCE TO RELATED APPLICATIONS

This invention is related to the invention disclosed and claimed in commonly assigned U.S. Patent Application Ser. No. 203,676, filed June 7, 1988 and U.S. Pat. No. 4,916,736 for "Method and Apparatus for Encrypting and Decrypting Time Domain Signals", the disclosure of which is hereby incorporated by reference.

BACKGROUND OF THE INVENTION

This invention relates to signal processing of time domain electronic signals, such as video information signals. More particularly, the invention relates to techniques for encrypting and decrypting such signals to prevent unauthorized use thereof.

Many techniques have been devised for encrypting and decrypting time domain information signals. The purpose for such techniques is always the same: viz., to prevent unauthorized use of the signals. In the case of video type information signals, the unauthorized use to be prevented is normally the visual display of the information signals for their entertainment or instructional value. Such signals are vulnerable to unauthorized use in a number of ways. For example, if the video signals are being broadcast over a satellite or microwave link, unauthorized users attempt to intercept the signals, and view same without paying for the subscription service. In an effort to defeat such unauthorized uses of broadcast video information, several specific signal scrambling techniques have been successfully used.

Another means of conveying video information from one location to another is through the medium of video tape. For example, it is quite common for motion picture studios to send master videotapes of movies around the world. If the videotapes get stolen or "lost" in transit, a clear opportunity for piracy exists. It is therefore desirable to be able to scramble the video signal prior to recording it on videotape so that the tape can only be utilized by a user having a descrambler and appropriate codes. Such a scrambling system must have two important characteristics—it must be very secure and it must be compatible with the record/replay electronics of preferably all professional and consumer grade video recorders.

There are many known ways for scrambling video signals. Two simple techniques are sync suppression and sync inversion, each of which can, however, be readily defeated by using elementary video signal processing techniques and in any case cannot be recorded. Another technique is termed pseudo-random video-level invention, which is relatively difficult to defeat but which suffers from the disadvantage of a severe loss of picture quality due to non-linearities in the record/playback process. Still another technique is line-order interchange, also known as line shuffling, in which the order of the lines in the raster scanned picture is shuffled. As an example, instead of transmitting the lines sequentially as line number 1, line number 2, line number 3, . . . etc., the information might be transmitted as line number 182, line number 99, line number 4 . . . , etc. Such a system can be made very secure (i.e., very difficult to defeat), but it cannot be used in any videotape format employing the color-under principle which relies upon line adjacency to obtain correct color rendition upon reproduction.

Still another technique is pseudo-random line rotation in which some of the lines of the picture selected in random fashion are transmitted in inverse temporal order (i.e., right to left), while the remainder are transmitted in the normal fashion (i.e., left to right). Yet another technique is termed line segmentation with pseudo-randomly chosen break points, in which each line is broken into two randomly chosen segments and the segments are sequentially transmitted with the right hand segment being transmitted first, followed by the left hand segment. Both of these video signal scrambling methods give rise to severe color contamination between the left and right hand sides of the picture when employed on any format which uses color-under recording.

In addition to the above disadvantages, the last three noted techniques suffer from the further disadvantage that the processing is incompatible with the drop out compensation signal processing employed in most video recorder devices. While, in principle, these three methods could be used for video signal processing formats which do not employ color-under recording, such as professional type B and type C one inch formats, such a use would require special drop out compensation circuitry in which drop out sensing and correction are controlled by the descrambling system. This would require special modification of playback equipment, which adds undesired cost and complexity to an encryption/decryption system.

None of the above-described video scrambling techniques fully meets the desired requirements for a video scrambling system in which (1) the scrambled video can be recorded and subsequently replayed on any video tape format—professional or consumer—and be descrambled on replay, with negligible loss of picture quality; (2) the scrambling technique is virtually impossible to defeat by any unauthorized user; and (3) the scrambled video is unaffected by passage through the various kinds of processing equipment used in television production facilities, satellite links and cable networks.

In the above-referenced copending U.S. Patent Application Ser. No. 203,676, now U.S. Pat. No. 4,916,736 a method and apparatus are disclosed which provides a highly secure video type information signal encryption and decryption technique which is compatible with all video tape formats and transmission systems and is free of picture impairments caused by the interaction of the scrambling algorithm and the chrominance consecutive— line averaging—system used in color-heterodyne recording. According to the method disclosed therein, video type information signals are encrypted by individually time shifting the active video portion of at least some of the lines of the video signals with respect to the line timing reference (horizontal sync in an NTSC encoded system) and providing an indication of the time shifting performed in order to enable subsequent decryption. For color video information signals, time shifting is inhibited during the horizontal sync signal portion and the color reference signal portion. Similarly, the non-active video portions of a field or frame of information (i.e., the vertical blanking portions) are not time shifted. Decryption of the encrypted signals is accomplished by using a process which is the inverse of the encryption process. For optimum results, and in order to ensure compatibility between the encryption method and other conventional signal processing techniques (in particular the color-heterdodyne system of video cassette recorders) the amount of time shift between adjacent lines is preferably limited to ±N subcarrier cycles where N is a whole number (preferably 0 or 1). In addition, the maximum aggregate time shift of the active video is limited so that the active video does not overlap either the color burst or the horizontal sync reference portions of the individual lines.

While the above encryption/decryption technique is highly effective, optimal implementation requires digital video circuitry at the decryption site (i.e., the t.v. monitor or receiver) of some complexity, which adds substantial cost to the total system.

SUMMARY OF THE INVENTION

The invention comprises a method and apparatus for providing a highly secure video type information encryption and decryption technique which is compatible with all video tape formats and transmission systems, is free of picture impairments caused by the interaction of the scrambling algorithm and the chrominance consecutive line averaging systems used in color-heterodyne recording, and which can be implemented at substantially lower cost than the system previously described.

From a method standpoint, the invention includes the encryption of information signals normally arranged as a succession of lines of active information, each line having a line timing reference, the method comprising the basic steps of individually time shifting the active information portion of at least some of the lines of the signals with respect to the line timing reference portion, and providing an indication of the time shifting performed in the time shifting step in order to enable subsequent decryption. For information signals which are video information signals containing line sync signal portions and color reference signal portions, the time shifting is performed on the active video with respect to both these timing portions of the individual lines. The non-active portions of a field or frame of information, i.e., the vertical blanking portions, are not time shifted.

The type of time shifting performed may comprise any one of a number of slowly varying functions, such as a sinusoidal wave form or a linearly changing ramp signal. The rate of change in the signal should be relatively slow when compared to the line rate of the input signals to be processed. For video type signals, a sinusoidal wave form having a frequency of no more than about 20 Hz is suitable, while for a linearly varying ramp signals a slew rate of comparable rate is suitable. The absolute amount of time shifting performed is preferably limited to a maximum value which, in the case of NTSC video signals, does not exceed a total of 4 microseconds (±2 microseconds in each direction).

The instantaneous value of the time shifting wave form function at the beginning of each field is conveyed along with the field information, typically during the vertical blanking interval. For example, with respect to a sinusoidal time shifting function the starting amplitude of the wave form during a given field is transmitted during the vertical blanking interval as a single byte of information which, when combined with a separately provided authorization key, enables a descrambling circuit to synthesize the scrambling wave form function. Decryption is the inverse of the encryption process and is performed by restoring the original timing relationship between the horizontal sync (and color burst) and the active video portion of the corresponding line. This is done by generating new line timing reference signals (horizontal sync and color burst) which bear the same timing relationship to the active video portion as the original line timing reference signals before encryption. The resulting descrambled signals still contain time base errors, but the errors are within the capture or correction range of the follow-on television monitor/receiver.

The invention can be implemented using mostly conventional analog circuits for the descrambling device, which makes the descrambling devices economical to manufacture and easy to repair.

For a fuller understanding of the nature and advantages of the inventions, reference should be made to the ensuing detailed description taken in conjunction with the accompanying drawings.

DESCRIPTION OF THE PREFERRED EMBODIMENTS

Figure 1:
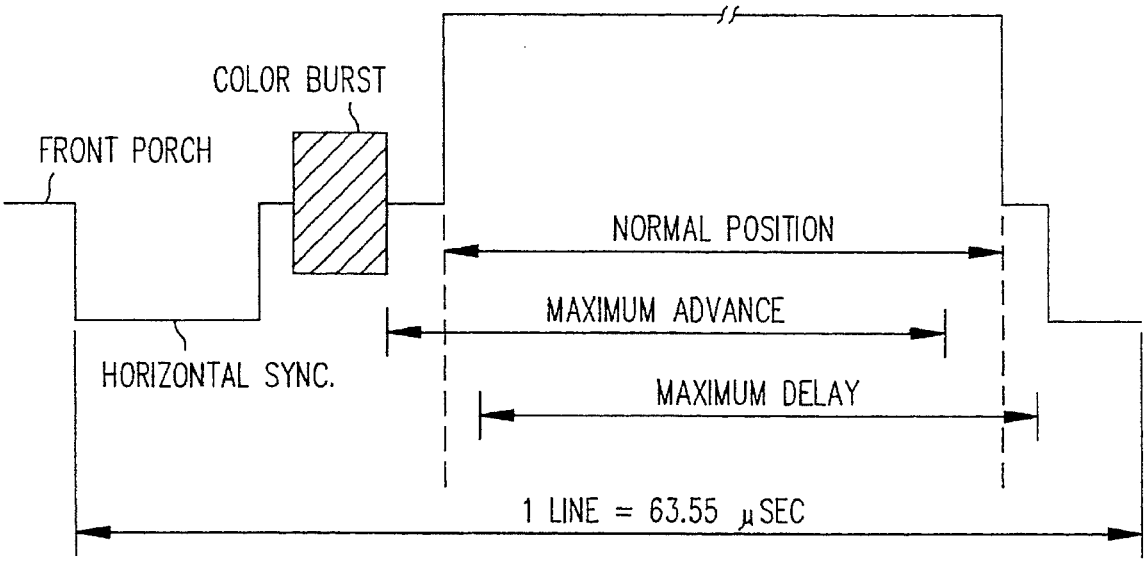
FIG. 1 is a schematic diagram illustrating one line of video type information to which the invention applies.

The underlying principle of the invention can be best understood with reference to FIGS. 1, 2A–2C and 3A–3B. FIG. 1 illustrates one line of NTSC video information, with the active video portion of the line compressed along the horizontal scale. As seen in this Figure, one line of active video, which extends between the leading edge of the horizontal sync signals of adjacent lines, includes a color burst reference signal portion followed by active video. The leading edge of the horizontal sync pulse precisely defines the beginning of the line and serves as a line timing reference. According to the invention, the active video portion of a line is time shifted with respect to the active video portion of other lines in a predetermined manner. For example, the normal position of the active video is illustrated in FIG. 1. During encryption, this position is time shifted in either an advance direction (i.e., closer to the horizontal sync portion of the given line) or in a delay direction (i.e., toward the horizontal sync portion of the next succeeding line). In order to preserve most of the active video in each line, maximum limits are placed on the relative and total amount of time shifting in the advance and delay directions. In the preferred embodiment, for NTSC video this amount is ±2 microseconds (a total of 4 microseconds).

The manner in which the time shifting is performed is determined in advance and must be relatively slow with respect to the line rate of the information signals in order to permit the signals to be properly processed after descrambling, as described more fully below. Many different types of wave form functions may be used to control the amount and direction of time shifting. Examples of such wave forms are a sinusoidal wave form, rectangular waves, ramps, and low frequency random or pseudo random noise signals. Other appropriate time shifting functions will occur to those skilled in the art. It has been empirically determined that a practical maximum rate on the time varying wave form used to control the time shifting is about 20 Hz for presently equipped television monitors and receivers equipped for NTSC signal processing.

Figure 2A:
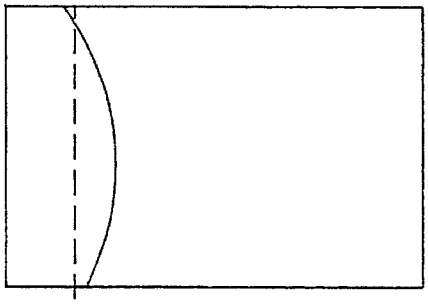
FIGS. 2A–2C are schematic diagrams illustrating the visual effect of a sinusoidal time shifting on three successive fields of information.
Figure 2B:
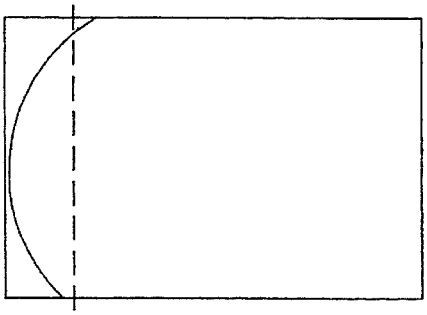
Figure 2C:
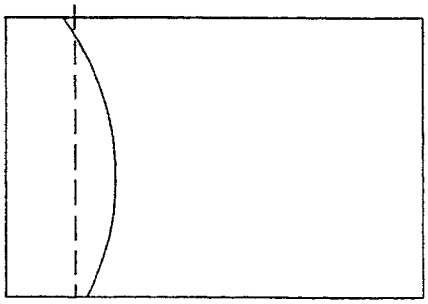

FIGS. 2A–2C illustrate in schematic form the visual effectiveness of the invention on an image when a relatively slowly varying sinusoidal time shifting is performed on the active video portions of the video information signals. In these Figures, the rectangular outline illustrates the entire field of the raster (including the non-viewable portions of each line), and the vertical dotted lines represent the normal position of the beginning of the viewable portion of each line. The curved solid lines illustrate the manner in which the image is distorted during three successive fields using a slowly varying sinusoidal time shifting wave form. This level of distortion is sufficient to remove the entertainment value from a picture. It should be understood that the magnitude of the time shifting illustrated in FIGS. 2A–C is greatly exaggerated for illustrative purposes.

Figure 3A:
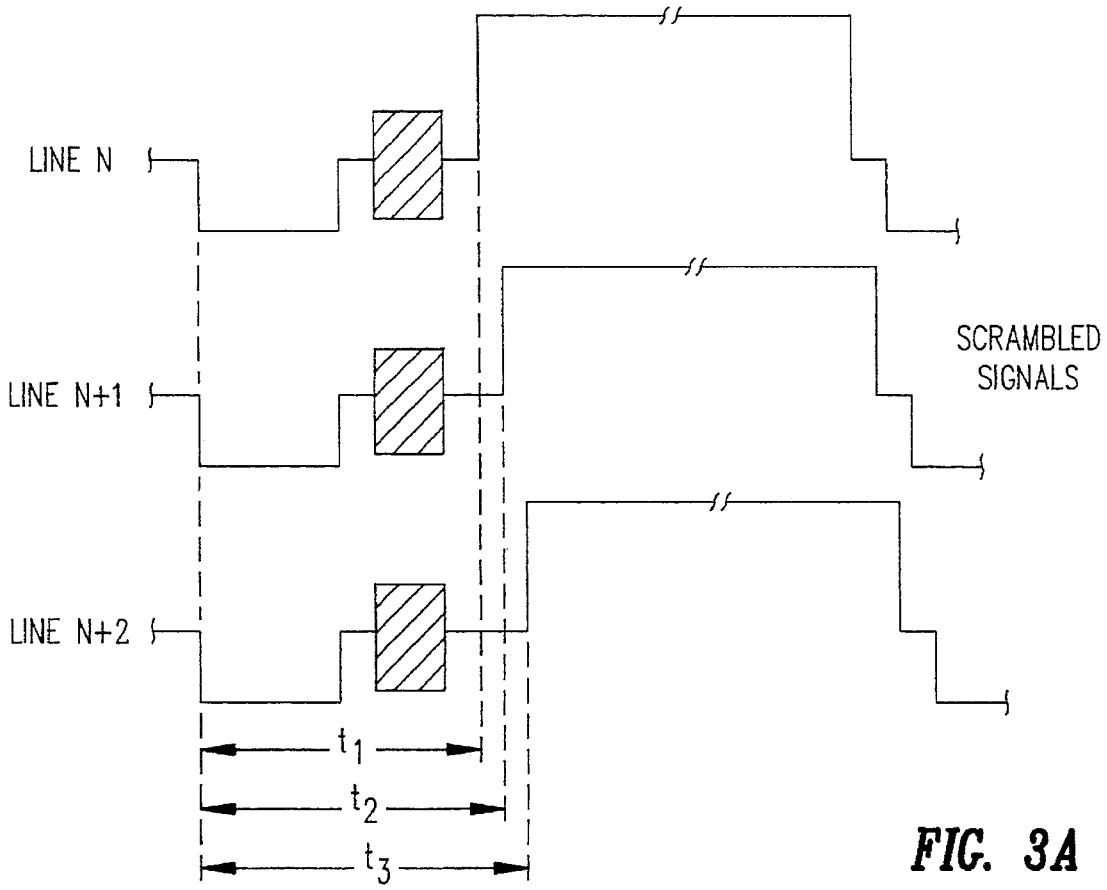
FIGS. 3A–3B are schematic diagrams illustrating the scrambled and descrambled signals.
Figure 3B:
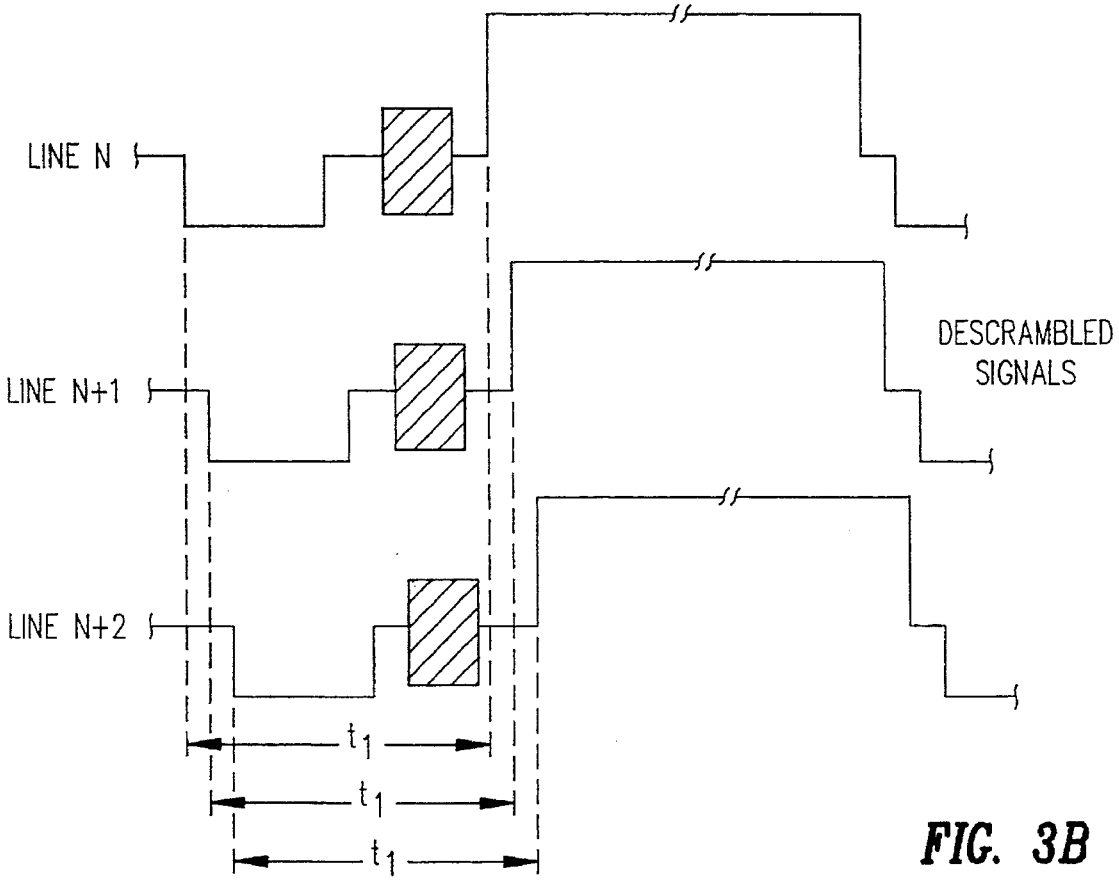

FIGS. 3A and 3B illustrate the manner in which the scrambled or encrypted signals are decrypted or descrambled at the reception site. With reference to FIG. 3A, three successive lines of NTSC video are shown which have been time shifted successively by increasing mounts. As with the FIG. 1 diagram, the active video portions of each of the lines in FIGS. 3A. and 3B are only fractionally illustrated. The topmost line represents a line N having had no time shifting between the active video portion, and the time between the beginning of the horizontal sync portion and the active video portion is designated as $t_1$. The next line, line N+ 1, has undergone time shifting in the delay direction so that the time between the beginning of the horizontal sync portion and the beginning of active video portion is $t_2$, greater than $t_1$. Line N+2 has undergone even more time shifting in the delay direction by an amount labelled $t_3$ greater than $t_2$. These three successive lines could represent lines from the upper portion of the raster image schematically depicted in FIG. 2A. It is important to note that the line timing reference part of each of the lines N, N+ 1 and N+2 are all temporally aligned: the leading edge of the horizontal sync portion of each line is exactly aligned with the leading edge of the horizontal sync portion of the other lines. The same is true of the location of the color burst portions. The active video portions, however, are deliberately mis-aligned in lines N+ 1 and N+2 with respect to line N.

FIG. 3B illustrates the signals for the same three lines after descrambling or decrypting. As can be seen in this figure, the leading edges of the horizontal sync portions of the three lines are no longer precisely aligned, but are rather staggered: however, the distance between the leading edge of the horizontal sync portion and the beginning of active video is the same for all three lines, viz., the value $t_1$. Similarly, the color burst portions of the three lines are no longer temporally aligned, but are rather staggered in the same fashion as the horizontal sync portions. The relative positioning of the active video portion of the three lines remains the same.

Although the descrambled signals are still relatively mis-aligned, the precise timing relationship $t_1$ between the leading edge of horizontal sync and the beginning of active video ensures that each line of information, when processed by the follow-on television receiver or monitor, can be properly displayed, provided that the timing error in a given line does not exceed the capture range of the television receiver or monitor synchronization circuitry. It has been empirically determined that synchronization of each line of video can be assured provided that the time shifting function used to initially encrypt the signals does not vary at a rate greater than about 20 Hz for NTSC encoded video. While other maximum frequency limits may apply to other television information signal encoding system (such as PAL or SECAM), the general rule is that the time shifting applied to the original signals during encryption must be relatively slowly varying compared to the line rate. Stated differently, the time error introduced into the signals as a result of the scrambling/descrambling process must not fall outside the capture range of the synchronization circuitry in the follow-on television receiver or monitor.

Figure 4:
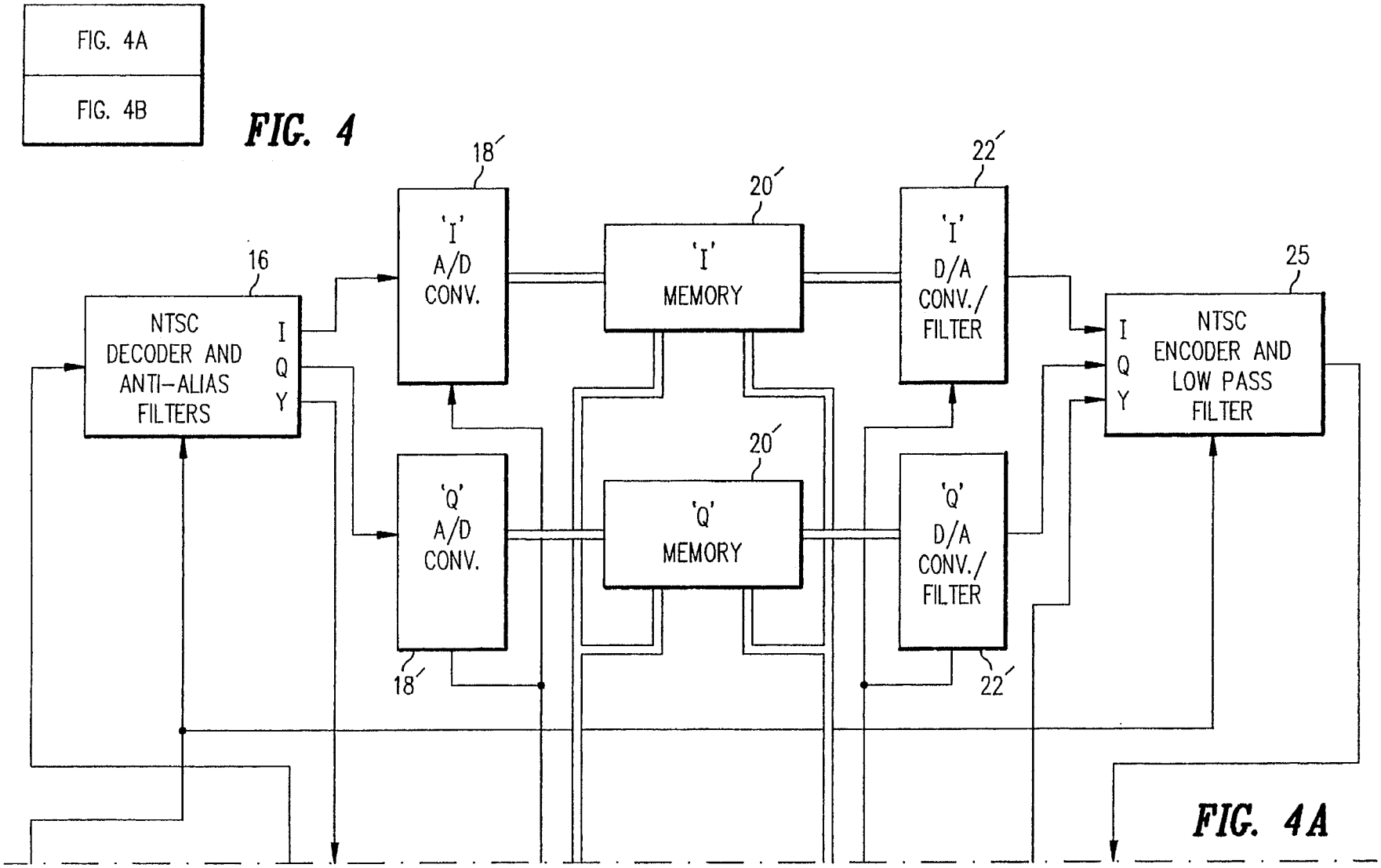
FIG. 4 is a block diagram of a scrambler unit.
Figure 4B:
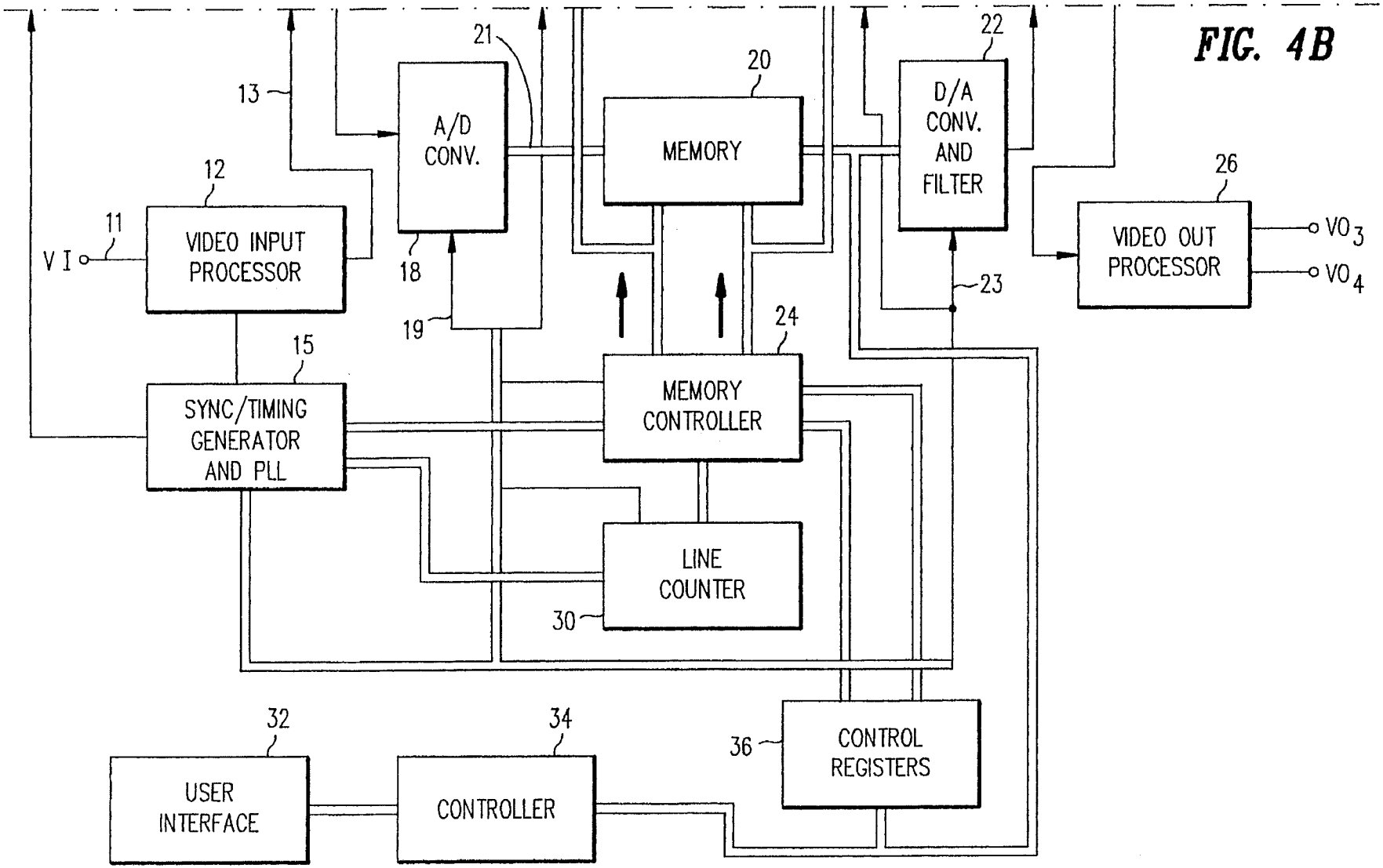

FIG. 4 is a block diagram of a scrambler system capable of providing the encryption described above. As seen in this Figure, input video to be encrypted is coupled to an input terminal 11 of a video input processor 12. Processor 12 functions to normalize the incoming video signal relative to gain, DC offset and bandwidth, and provides a stable low impedance buffer unit for the video appearing on output terminal 13. In addition, the incoming vertical and horizonal sync portions are separated from the input video by processor unit 12 and supplied as an input to a sync/timing generator and phase locked loop unit 15, which is illustrated in greater detail in FIG. 5.

The signals output from processor unit 12 appearing on output terminal 13 are coupled to a conventional NTSC decoder and anti-alias filter unit 16 in which the luminance component Y and chrominance quadrature components I, Q are separated for parallel processing in the digital domain. The Y output of unit 16 is coupled to an analog-to-digital converter 18 in which the luminance is converted from analog to digital form at a preselected clock rate by means of an input sample clock signal supplied on clock input line 19. The output of converter unit 18 is coupled to an input portion of a dual ported luminance memory unit 20. Memory unit 20 is configured as a memory in which a word is written from the A/D converter 18 into the memory every memory cycle and a word is read from the memory unit 20 to a digital-to-analog converter unit 22 every memory cycle. The storage capacity of luminance memory unit 20 should be at least equal to the number of multi-bit characters (bytes) required to store one complete line of luminance information at the selected clock rate. Read/write control signals and multi-bit address signals are supplied to the luminance memory unit 20 from a memory controller unit 24. The output of luminance memory unit 20 is coupled to the input of a digital-to-analog converter 22, in which the multi-bit digital words output from memory unit 20 are converted into analog samples at the clock rate by clock signals supplied from unit 15 on clock input line 23. The output of converter unit 22 is coupled to the input of an NTSC encoder and low pass filter unit 25 in which the luminance signal is combined with the I and Q chrominance components and renormalized with respect to bandwidth and DC offset. The I, Q chrominance quadrature components are processed in an essentially identical manner to that already described for the luminance component Y in units 18', 20', and 22', which function in the same manner as units 18, 20 and 22.

Sync timing unit 15 is used to generate the input clock signals used to provide the sample clock for A/D converter unit 18, the read and write clock signals from memory unit 20, and the clock signals for D/A converter unit 22. Preferably, unit 15 is comprised of a discrete phase detector, a number of sampling gates, an error amplifier and a crystal clock oscillator.

The above described units are coupled to a user interface device 32, such as a keyboard terminal, via a controller unit 34 and a plurality of control registers 36. The controller 34 includes the circuitry shown in FIG. 7 for generating the time shifting wave form used to time shift the signals undergoing encryption. Controller 34 also generates an encrypted byte of information containing information required by the descrambler to generate the same time shifting wave form. This byte is encrypted using any suitable encryption technique and the result is inserted into one of the unused lines of the vertical blanking interval.

Figure 5:
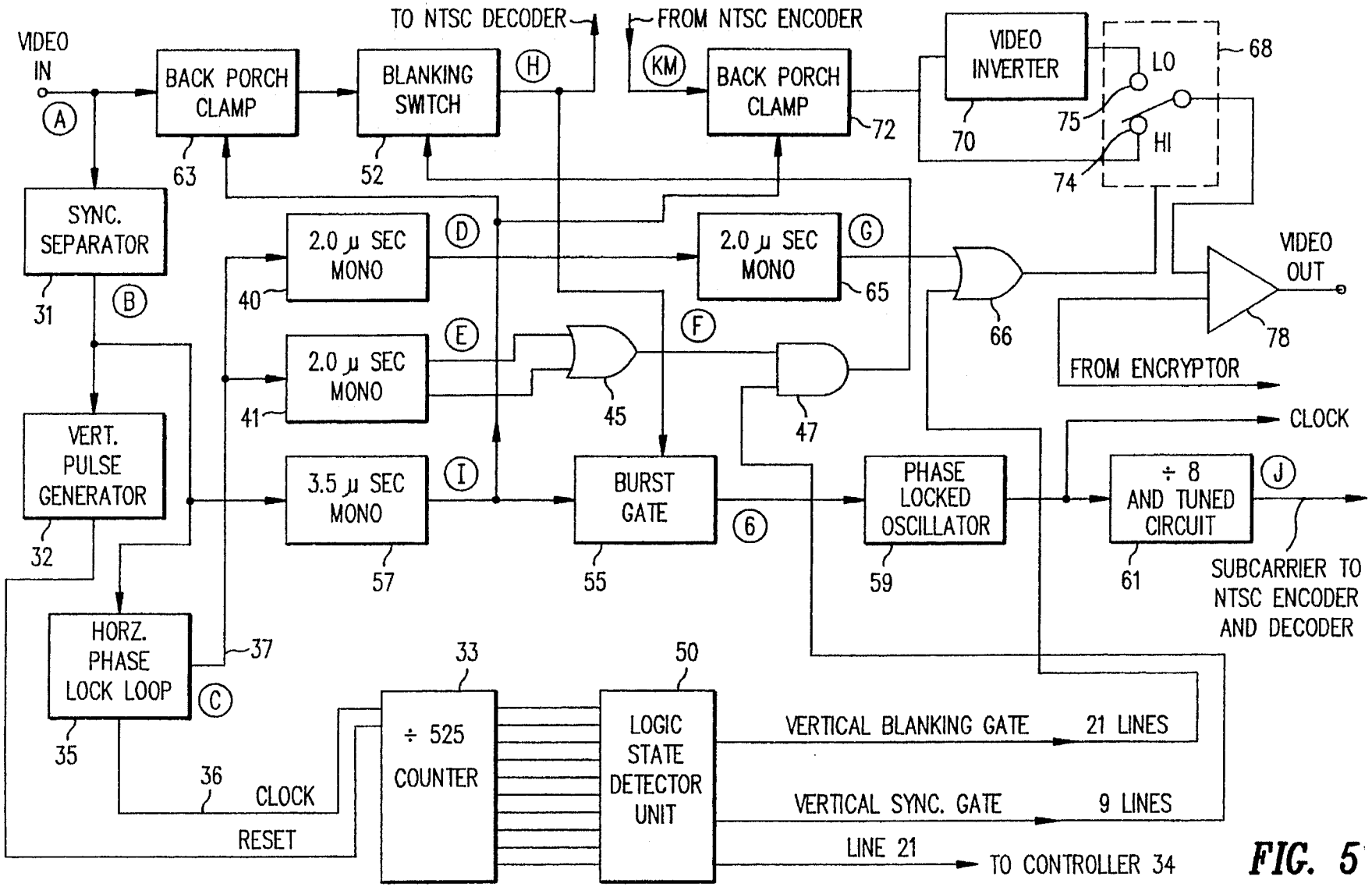
FIG. 5 is a more detailed block diagram illustrating portions of the video input processor, video output processor and sync/timing generator of the FIG. 3 scrambler unit.
Figure 6:
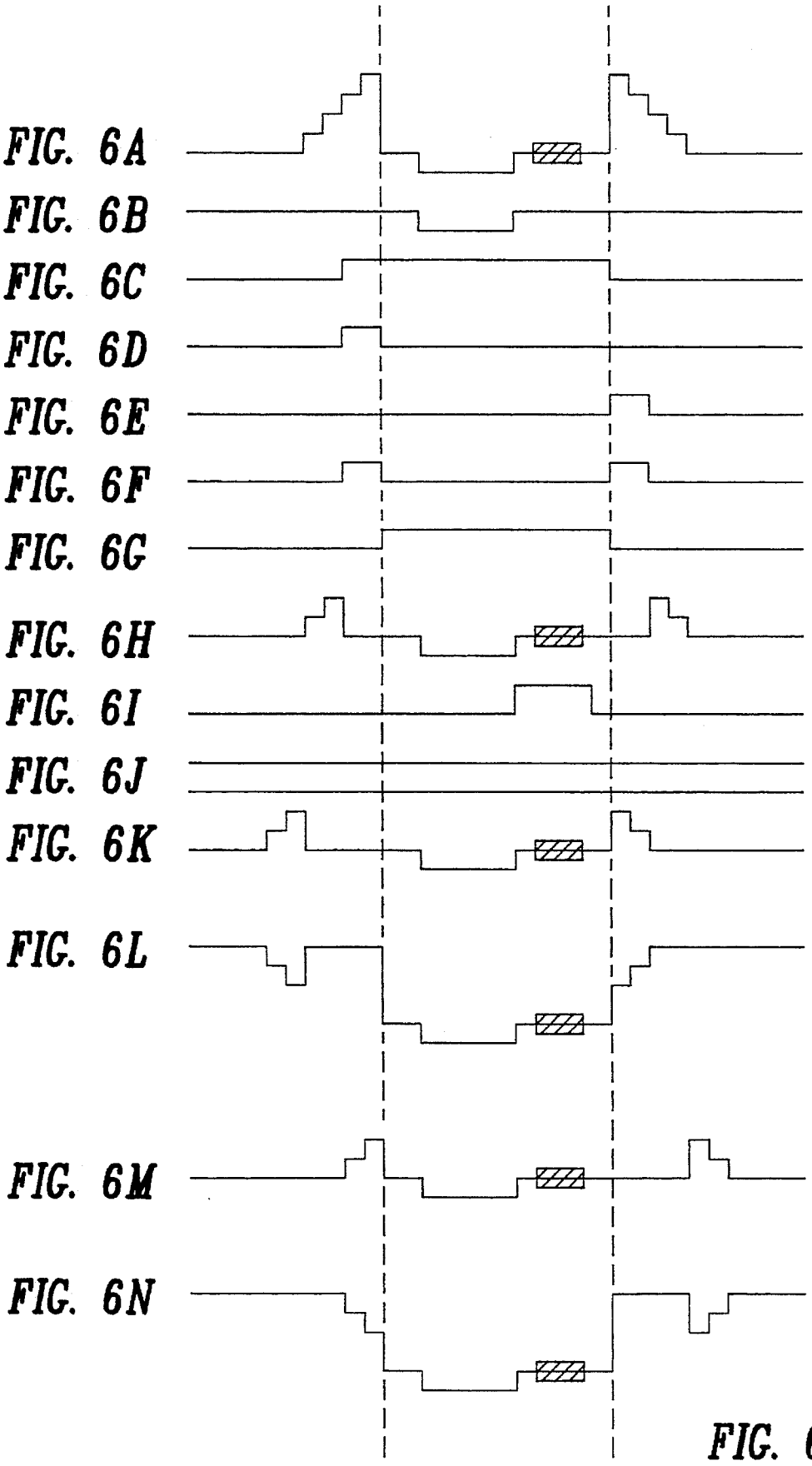
FIG. 6 is a series of wave form diagrams illustrating selected wave forms from the FIG. 4 block diagram.

FIG. 5 illustrates key portions of the video input processor 12, video output processor 26 and the sync/timing generator 15 of FIG. 4. As seen in this Figure, the video present on input terminal 11 is coupled to a sync separator 31 in which the horizontal and vertical sync portions are detected. The vertical sync pulses output from the sync separator 31 trigger a vertical pulse generator 32, which is coupled as a reset signal to the input of a divide by 525 counter 33 functioning as a line counter. The horizontal sync pulses output from sync separator 31 are used to drive a horizontal phase locked loop 35, which generates on a first output line 36 a clock signal for counter 33 having a frequency which is twice the line frequency (31.5 Khz). Horizontal phase locked loop 35 also generates at the line rate a pulse which is 2 microseconds wider than the normal horizontal blanking pulse (See FIG. 6, wave form 6C), and this pause is coupled via output line 37 to the input of a pair of monostable multivibrator circuits 40, 41. Multi-vibrator circuit 40 generates a 2.0 microsecond wide pulse (wave form 6D) triggered on the rising edge of the input signal. Multivibrator circuit 41 generates a 2.0 microsecond wide pulse (wave form 6E) triggered on the falling edge of the input signal thereto. The output signals from multivibrator units 40, 41 are passed through an OR gate 45, the output of which (wave form 6F) is coupled as one input to an AND gate 47. The other input to AND gate 47 is a vertical sync gate signal output from a logic state detector unit (preferably a PROM) 50. The vertical sync gate signal output from unit 50 is a disabling signal for AND gate 47 which has a duration of nine horizontal lines and which functions to disable the output of AND gate 47 throughout the vertical sync interval. The output of AND gate 47 is coupled to a blanking switch 52 and serves to extend the blanking interval by two microseconds on each side of the normal blanking time. Although this results in the loss of some active video on the trailing edge of previous line and the leading edge of active video in the current line, this loss is not significant. The output of blanking switch 52 (wave form 6H) is coupled to the input of the NTSC decoder 16 described above with reference to FIG. 4, and also to the input of a burst gate circuit 55. Burst gate circuit 55 is operated by the control output signal from a monostable multivibrator unit 57 (wave form 6I), which is a 3.5 microsecond wide pulse beginning at the trailing edge of horizontal sync and which is used to gate the burst portion of the incoming video signal to a phase locked subcarrier oscillator circuit 59. Oscillator circuit 59 generates a subcarrier signal at eight times the nominal subcarrier frequency, and the output from oscillator circuit 59 is used as the clock signal for the A/D units 18, 18', D/A converter units 22, 22', memory controller unit 24, line counter 30 and any other circuits requiring a synchronized clock. The output of oscillator circuit 59 is also coupled to the input of a divide by eight tuned circuit 61, the output of which provides 3.58 Mhz subcarrier which is phased locked to the incoming color burst. This subcarrier (wave form 6J) is coupled to the NTSC decoder and encoder circuits 16, 25.

The output of multivibrator circuit 57 is also coupled to a back porch clamp circuit 63 and is used to enable the clamp during color burst time.

The output of the multivibrator circuit 40 is coupled as an activating input to a monostable multivibrator circuit 65 triggered by the falling edge of the input signal and which generates a horizontal blanking pulse of normal length (11 microseconds; wave form 6G). The output of multivibrator circuit 65 is coupled via an OR gate 66 to the control input of a video switch circuit 68. The other input provided to switch circuit 68 via OR gate 66 is a vertical blanking gate signal generated by logic state detector unit 50. The vertical blanking gate signal is an enabling signal having a duration of 21 lines and occurring during the vertical blanking interval of each field.

The purpose of video switch circuit 68 is to alternate between two versions of the time shifted video: one passing through a video inverter circuit 70 and one bypassing the video inverter circuit 70. The video from NTSC encoder unit 25 (FIG. 4) is coupled to the input of a back porch clamp circuit 72 which is also controlled by the output of the multivibrator circuit 57. The output of the back porch clamp circuit 72 is coupled to the two input terminals of switch 68: the video is coupled directly to HI terminal 74 and through video inverter circuit 70 to LO terminal 75.

The output of switch 68 (wave forms 6L, 6N) is coupled through a video amplifier 78 and serves as the video output for follow-on use (typically either for broadcast or recording on tape).

As noted above, the time shifting is performed in the digital domain on the luminance and chrominance quadrature components in a synchronous fashion. After the time shifting has been effected, the digital signals are transformed to the analog domain and are recombined in the encoder circuit 25. The time shifted video is then inverted during the active video portions by means of the inverter circuit 70 and the switch 68 to produce the time shifted, inverted video scrambled signals shown in wave forms 6L and 6N of FIG. 6. In particular, wave form 6K illustrates the result of time shifting the active line video in the advance direction. Wave form 6L illustrates the result of passing this time shifted signal through the video inverter circuit 70 during active video time. Similarly, wave form 6M illustrates the result of time shifting the active line video in the delay direction, while wave form 6N illustrates the result of passing this time shifted signal through the video inverter circuit 70 to invert the active video portions.

Figure 7:
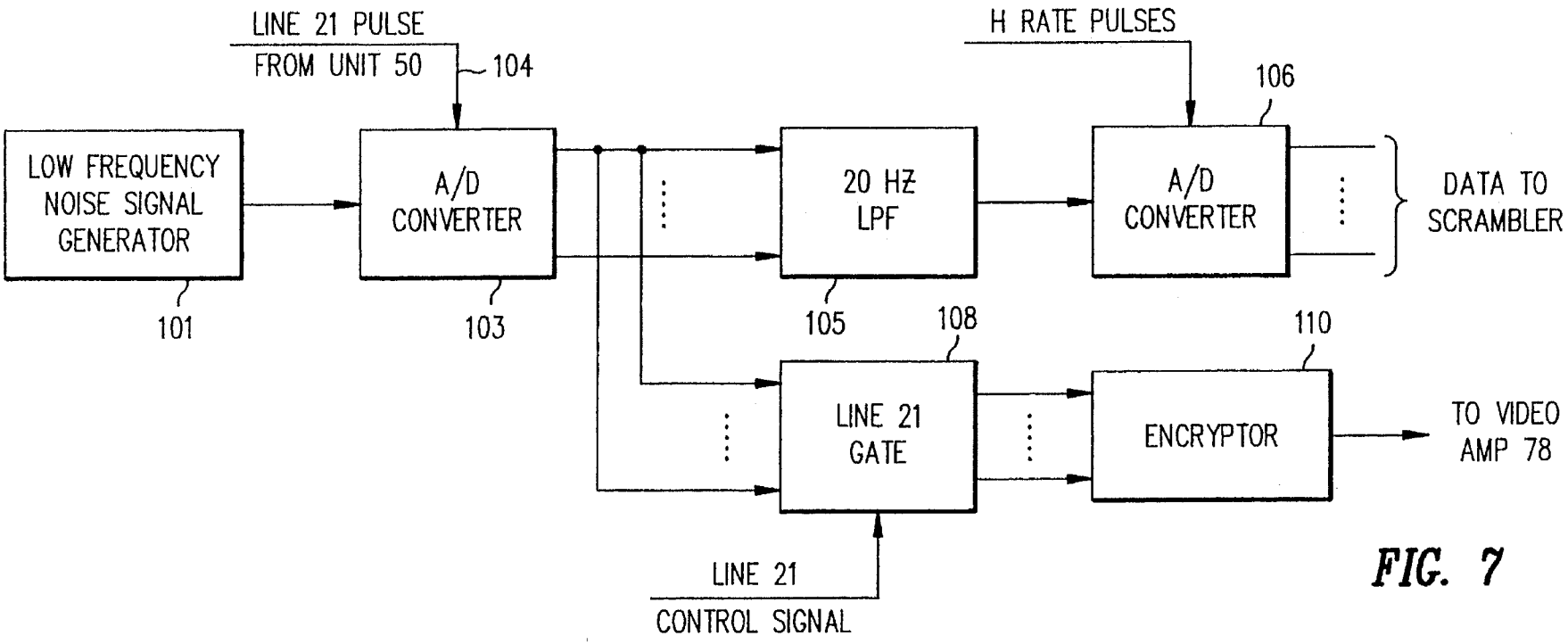
FIG. 7 is a block diagram of a portion of the controller 34 used to generate the time shifting wave form.

With reference to FIG. 7, the portion of the controller 34 used to generate the time shifting wave form includes a low frequency noise signal generator 101 capable of generating any appropriate relatively low frequency wave form to be used to define the time shifting function. As noted above, this may comprise a sinusoidal wave form, a ramp, a rectangular pulse or a random noise wave form. Such devices are well known in the art and will not be further described. The signal generated by the low frequency noise signal generator 101 is coupled to an analog-to-digital converter 103 which digitizes the amplitude of the signal output from the generator 101 at the rate of one sample per field of information. The sampling is controlled by a signal on controller input terminal 104. This control signal is obtained from the logic state detector unit 50 (FIG. 5) and, in the preferred embodiment, comprises a pulse generated during one of the lines occurring during the vertical blanking interval, such as line 21. The sample output from the analog-to-digital converter 103 is coupled via a 20 Hz low pass filter 105 to the input of a second analog-to-digital converter 106. Analog-to-digital converter 106 is clocked by the clock pulses generated at the horizontal sync rate (such as wave form 6B, FIG. 6). The output of the analog-to-digital converter 106 is coupled to the memory controller 24 via the control registers 36 and is used to control the actual magnitude of the time shifting performed on the active video portion of each line.

The output of analog-to-digital converter 103 is also coupled via a gate circuit 108, which is enabled during line 21, to an encryptor 110 which provides the encryption noted above for the time shift byte signal. The output of encryptor 110 is added to the video signal via video amplifier 78 (FIG. 5). Thus, the encrypted byte of time shifting wave form amplitude information at the beginning of each field is transmitted to each descrambler device along with the scrambled video signals and other timing signals.

Figure 8:
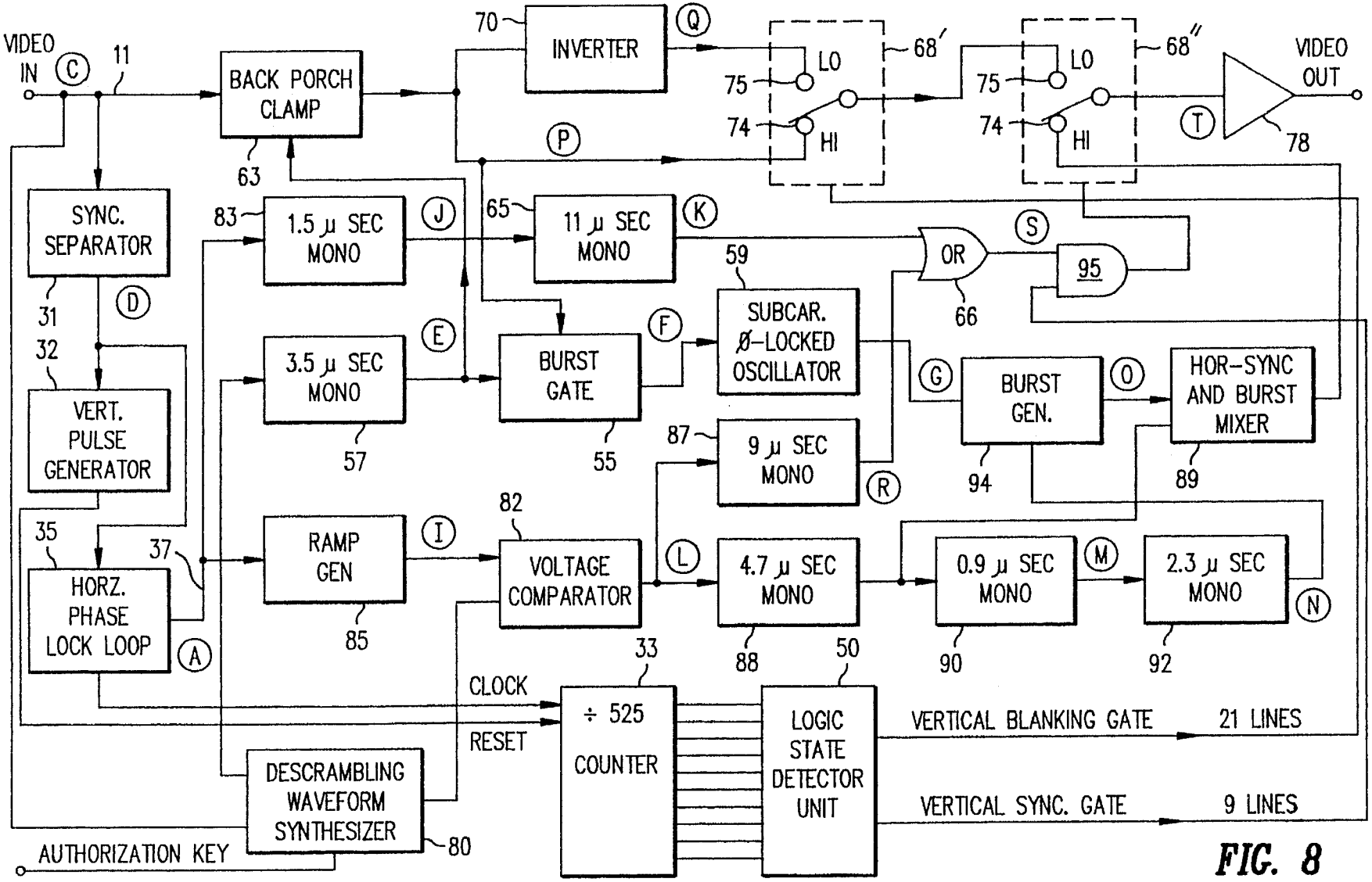
FIG. 8 is a block diagram illustrating a descrambler unit.
Figures 9, 9A, 9B, 9C, 9D, 9E, 9F, 9G, 9H, 9I, 9J, 9K:
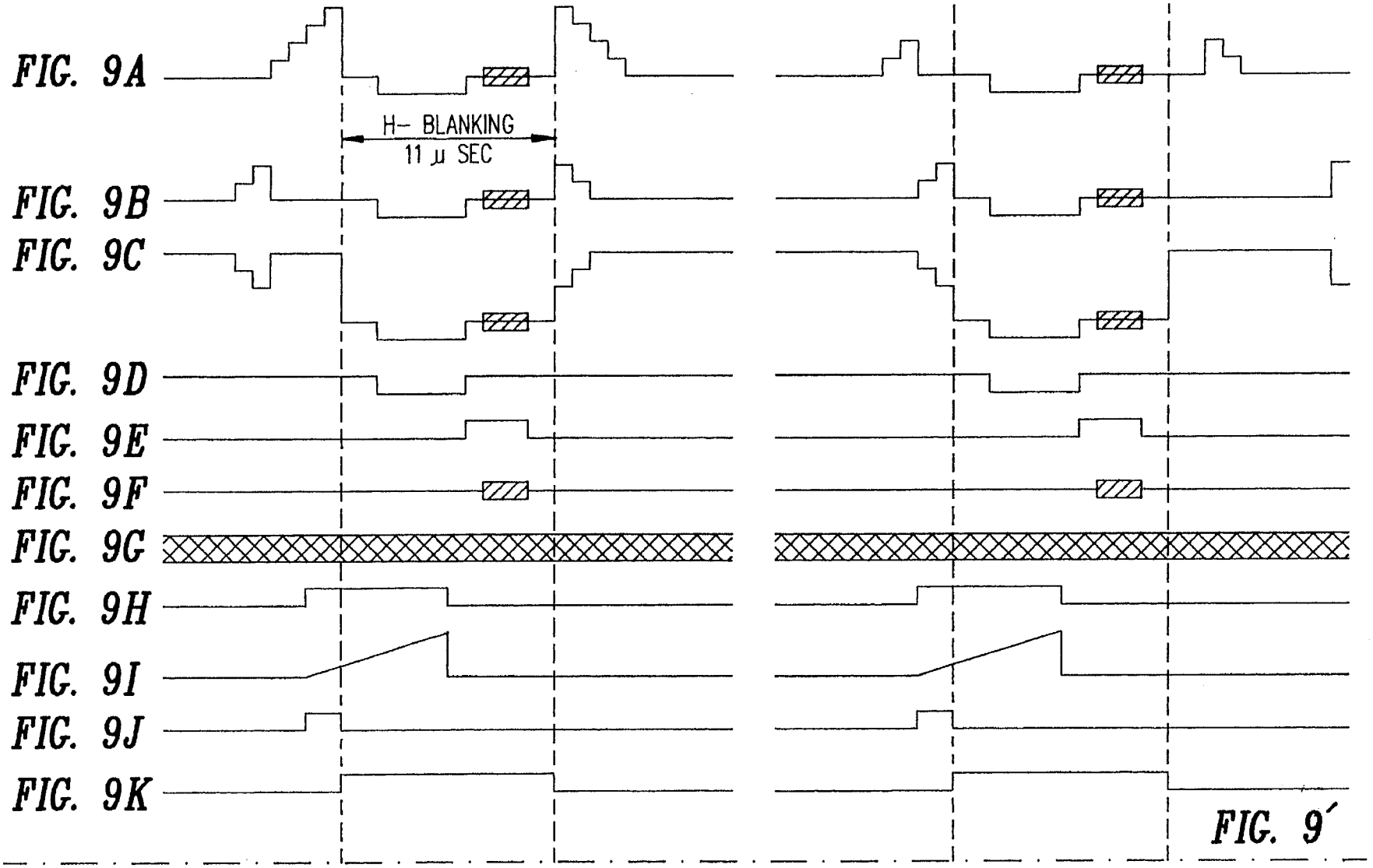
FIG. 9 is a series of wave form diagrams illustrating selected wave forms from the FIG. 6 block diagram.
Figures 9, 9L, 9M, 9N, 9O, 9P, 9Q, 9R, 9S, 9T:
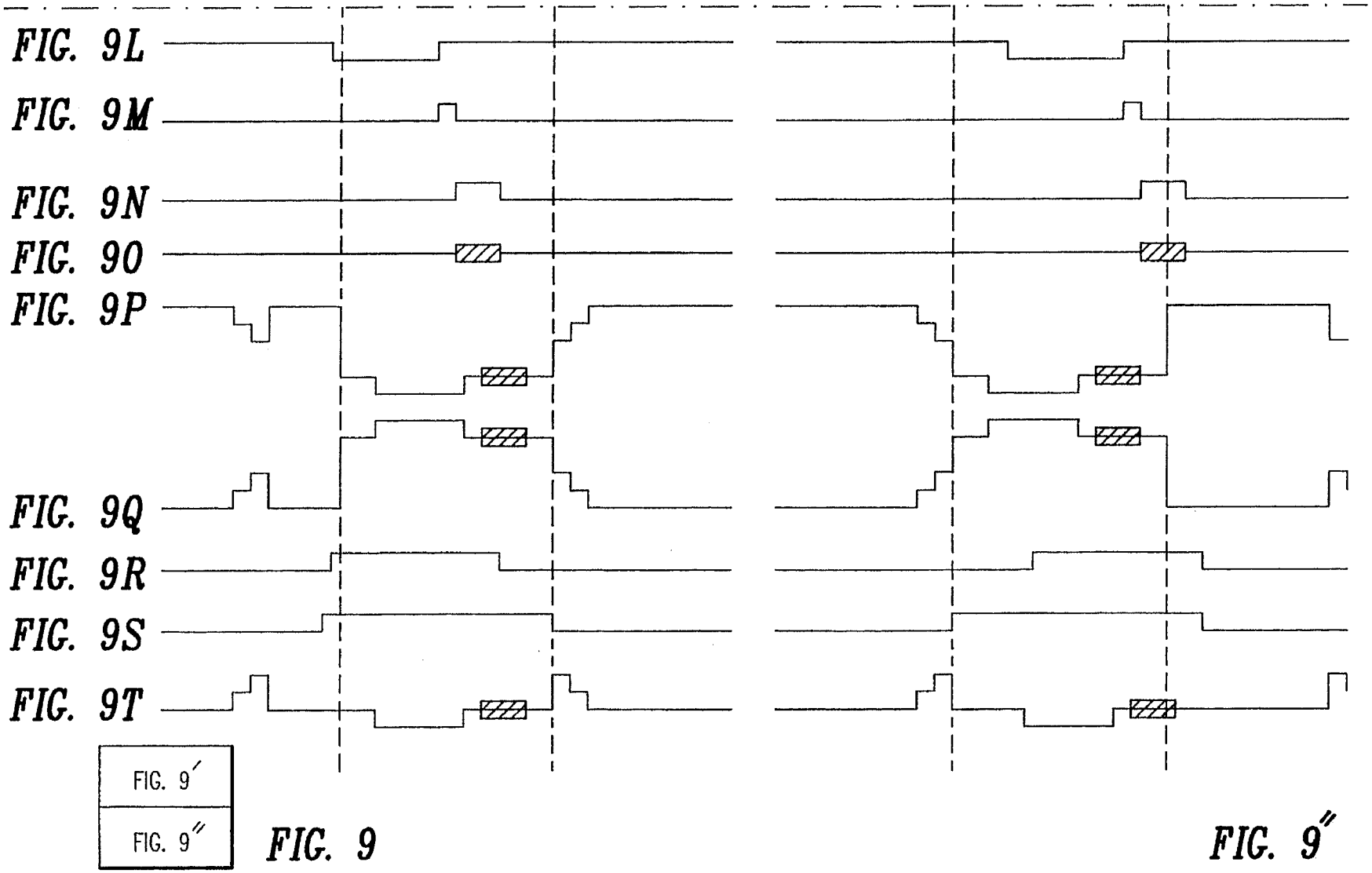

FIG. 8 illustrates the descrambler unit used to decrypt the signals received after encryption by the process described above. The descrambler shares many units in common with the scrambler shown in FIG. 5 and identical reference numerals have been employed for such units. The purpose of the descrambler shown in FIG. 8 is to restore the original time relationships between the horizontal sync and color burst portion of each line of video and the active video portion of that line. This operation will now be described, in conjunction with the wave form diagrams shown in FIG. 9.

Incoming video on input terminal 11 is coupled to the input of sync separator 31 and to the input of the back porch clamp circuit 63. The output of the sync separator 31 is coupled to the input of the vertical pulse generator 32, the input of the horizontal phase lock loop 35, to the input of the 3.5 microsecond monostable multivibrator 57 used to drive the back porch clamp circuit 63, and to the input of a descrambling wave form synthesizer circuit 80. A second input to the synthesizer circuit 80 is the authorization key signal generated by the user (i.e., the subscriber) used to decrypt the incoming bytes of time shifting wave form data encrypted by controller 34. This key is separately communicated to the subscriber in any secure mode, i.e., electronically, by mail, via telephone or the like. The other input to synthesizer 80 is the video input 11 which contains the information regarding the instantaneous value of the time shifting wave form at the beginning of a field of information. As described more fully below with reference to FIG. 10, the synthesizer circuit 80 regenerates the original scrambling wave form for input to voltage comparator unit 82, this voltage varying during the field in accordance with the nature of the time shifting wave form. For example, if a sinusoidal time shifting wave form was employed during encryption, the same sinusoidal wave form is needed during decryption to generate the varying voltage reference for each line of a given field. At the beginning of the next field, a new byte of time shifting wave form information is provided during vertical blanking in the received video, and this information is coupled to the synthesizer circuit 80.

The horizontal phase locked loop circuit 35 generates a first output pulse (wave form 9H) having a width equal to 6.0 microseconds but advanced in phase with respect to horizontal sync by a predetermined amount (1.5 microseconds in the preferred embodiment). This signal is supplied via output lead 37 to the input of a 1.5 microsecond monostable multivibrator circuit 83 and also to the input of a ramp generator circuit 85. Ramp generator circuit 85 generates a ramp voltage (wave form 9I) at a linear rate, and this ramp voltage is coupled to the other input of voltage comparator 82. When the level of the ramp voltage output by generator 85 matches that of the reference voltage from synthesizer circuit 80, the voltage comparator 82 generates an output signal which is used to initiate a nine microsecond monostable multivibrator circuit 87 and a 4.7 microsecond monostable multivibrator circuit 88. The multivibrator circuit 88 generates the new repositioned horizontal sync pulse to be added to the video (wave form 9L) and this sync pulse is coupled to one input of a horizontal sync and burst generator 89. The output of multivibrator circuit 88 is also coupled to the input of a 0.9 microsecond monostable multivibrator circuit 90, and the output of circuit 90 (wave form 9M) is coupled to the input of a monostable multivibrator circuit 92. The output of circuit 92 (wave form 9N) is coupled to the input of a burst generator circuit 94, which gates a burst signal at the subcarrier frequency from oscillator circuit 59 to the other input of the horizontal sync and burst mixer circuit 89. The output of mixer circuit 89, which comprises horizontal sync and color burst properly re-timed with respect to the active information portion of that line, is coupled to input terminal 74 of video switch circuit 68".

The output of the multivibrator circuit 83 (wave form 9J) is coupled to the input of monostable multivibrator circuit 65, which generates an 11 microsecond wide pulse (wave form 9K) defining the normal horizontal blanking interval. This signal is passed through an OR gate 66 along with the output of multivibrator circuit 87 to the first input of an AND gate 95. The other input to AND gate 95 is the vertical sync gate signal generated by logic state detector 50, which serves to disable the AND gate 95 from passing the control signal to video switch 68" during the nine lines of vertical sync within each field. Thus, video switch 68" can be switched from the normally closed terminal 75 to terminal 74 whenever the output pulse signals from multivibrator circuit 65 or 87 are active (wave forms 9K, 9R). Whenever switch 68" is connected to terminal 74, the output of the horizontal sync and burst mixer circuit 89 is coupled to the video output amplifier 78. Otherwise, the active video output from video switch 68' is coupled to the video output amplifier 78.

Video switch 68' is provided with two video inputs: the direct video passed through back porch clamp 63 (wave form 9P) or an inverted version (wave form 9Q) provided by inverter 70. The state of switch 68' is controlled by the vertical blanking gate signal output from logic state detector 50. Whenever this signal is active, the switch 68' is connected to terminal 74 and the direct video passes through. At all other times, the inverted version from inverter circuit 70 is coupled via terminal 75 to the output of switch 68'.

In operation, the incoming horizontal sync and color burst are discarded by the descrambler circuit of FIG. 8 and new horizontal sync and color burstt are generated in the proper timing relationship with respect to the active video portion of the incoming line. The new sync and burst provided by the mixer circuit 89 are coupled via terminal 74 through switch 68" as the new sync and color burst portion of the reconstituted video signal. During active video time, the input video is inverted by means of inverter 70 and coupled to the video output amplifier 78 to reconstitute the entire line. During the last 12 lines of the vertical blanking portion of a field, the active video line is passed directly through the first and second video switch circuits 68', 68". During the vertical sync gate portion of a given field, the AND gate 95 is disabled to prevent the synthesized horizontal sync and burst from being added to the incoming video signal.

Figure 10:
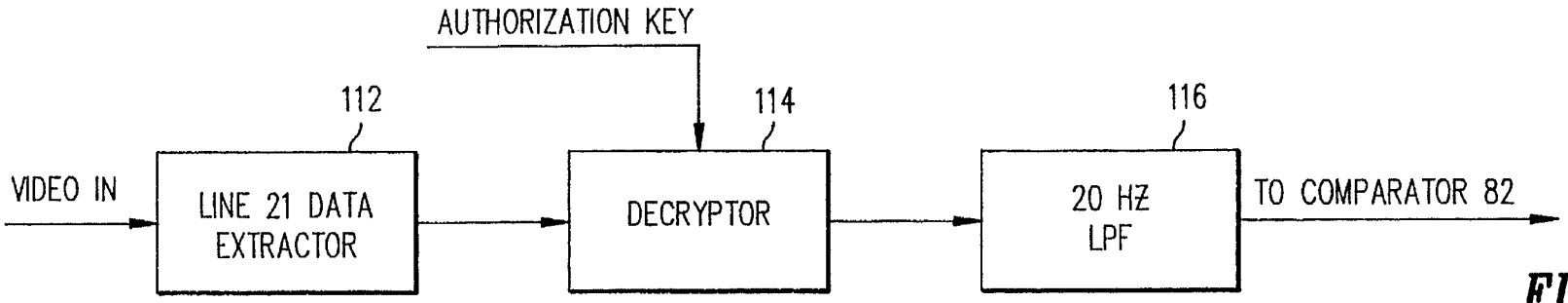
FIG. 10 is a block diagram illustrating the descrambler wave form synthesizer.

FIG. 10 illustrates the subunits comprising the descrambling wave form synthesizer 80. As seen in this Figure, the incoming video is coupled to the input of a data extractor 112 which detects the information in line 21 of the field specifying the amplitude of the time shifting wave form at the beginning of that field. Since this data is in encrypted form, it is coupled to the input of a decryptor 114 along with the authorization key provided by the subscriber/user by any suitable means, e.g., a keyboard. The decrypted digital amplitude value is coupled from decryptor 114 to the input of a 20 Hz low pass filter, which replicates or recovers the slowly varying time shifting wave form. The output of the 20 Hz low pass filter 116 is coupled to the voltage comparator 82 as the reference wave form voltage.

As will now be apparent, the invention provides a completely secure technique for encrypting and decrypting video type signals, which is fully compatible with all video tape formats and transmission systems and which causes at least enough picture concealment to remove all entertainment value from a program. In addition, since nearly all of the circuit elements and subunits in the descrambler are conventional off the shelf circuits and components, the scrambler unit is relatively inexpensive to manufacture and repair.

While the above provides a full and complete description of the preferred embodiment of the invention, various modifications, alternate constructions and equivalents will occur to those skilled in the art. For example, while the limitation on the combined maximum advance and delay time shifting has been specified as ±2 microseconds, other values can be selected. In general, the greater the magnitude of the combined maximum advance and delay employed the more active information is lost from the trailing portion of the preceding line and the leading portion of the line being time shifted. Therefore, the above descriptions and illustrations should not be construed as limiting the scope of the invention, which is defined by the appended claims.

What is claimed is:

1. A method of decrypting previously encrypted information signals to permit use thereof, said encrypted information signals comprising encrypted versions of original information signals arranged as a succession of lines of active information, each line having a line timing reference, said encrypted signals having been produced by time shifting at least some of the lines of the original information signals with respect to the line timing reference in a predetermined manner [with the amount of time shifting in each line in the succession being different than that of the previous line], said decrypting method comprising the steps of:

(a) providing an indication of the amount of time shifting performed on a given line; and (b) restoring the original time relationship for each line between the line timing reference and the line of information using the indication of the time shifting by generating deliberately temporally misaligned line timing reference for each line and combining said deliberately temporally misaligned line timing reference with the line of information.

2. The method of claim 1 wherein said encrypted information signals are video information signals containing line synchronization portions which were not time shifted during the encryption process; and wherein said step (b) of restoring includes the step of deleting line synchronization portions which have been received and inserting a new line synchronization portion.

3. The method of claim 1 wherein said encrypted information signals are video information signals containing color reference signal portions which were not time shifted during the encrypting process; and wherein said step (b) of restoring includes the step of deleting color reference signal portions which have been received, generating a new reference color signal portion and combining said new color signal portion with the line of information.

4. The method of claim 1 wherein said encrypted information signals are video information signals containing a plurality of lines of non-active video which were not time shifted during the encryption process; and wherein said step (b) of restoring includes the step of leaving the non-active video lines undisturbed.

5. The method of claim 1, wherein the step of restoring leaves a time base error between the decrypted information signal and a predetermined timing reference, said time base error being correctable by a television receiver.

6. A system for decrypting previously encrypted information signals to permit the use thereof, said encrypted information signals comprising encrypted versions of original information signals arranged as a succession of lines of active information, each line having a line timing reference,- said encrypted signals having been produced by time shifting at least some of the lines of the original information signals with respect to the line timing reference in a predetermined manner [with the amount of time shifting in each line in the succession being different than that of the previous line], said system comprising:

means for providing an indication of the amount of time shifting performed on a given line; and means for restoring the original time relationship between the line timing reference and the line of information by using the indication of the amount of time shifting, said restoring means including means for generating a deliberately temporally misaligned line timing reference for each line and means for combining said deliberately temporally misalignd line timing reference with the line of information.

7. The system of claim 6, wherein the means for restoring leaves a time base error between the decrypted information signal and a predetermined time reference, said time base error being correctable by a television receiver.

8. The system of claim 6, wherein the line timing reference for each line is temporally misaligned by the amount of timeshifting in the encrypted version of that line.

9. A system for encrypting information signals to prevent unauthorized use thereof, said system receiving original information signals arranged as a succession of lines of active information, each line having a line timing reference, comprising:

means for timeshifting the active information signal in each line relative to the line timing reference of that line, wherein the active information signal in each line is timeshifted by a predetermined [about different from the amount of timeshifting of the previous line in the succession of lines]; and means for inserting into the information signals an indication of the mount of time shifting;

wherein a maximum amount of timeshifting of one line relative to any other line in the succession of lines is a predetermined about, and wherein the encrypted information signals are decryptable by a receiver, and a rate of change in the amount of time shifting between successive line is within a capture range of synchronization circuitry in the receiver.

10. The system of claim 9, wherein the indication of the amount of time shifting is encrypted into data of predetermined length.

11. The system of claim 9, wherein the original information signals are NTSC standard television signals, and the predetermined maximum amount of timeshifting is 4 microseconds.

12. The system of claim 9, wherein the indication of the amount of timeshifting is inserted into an unused line in the vertical blanking interval in encrypted form.

13. The system of claim 9, wherein the indication is inserted into a portion of one line other than the active information portion.

14. The system of claim 9, wherein the amount of time-shifting of successive lines varies as a sinusoidal function.

15. The system of claim 9, wherein the amount of time-shifting of successive lines varies at a rate of no more than about 20 cycles per second.

16. A system for decrypting previously encrypted video signals to permit the use thereof, said encrypted video signals including time shifting of the active video portions of at least some of the lines of the video signals with respect to the synchronization portion of the lines in a predetermined manner [with the amount of time shifting in each line varying from that of the previous line], comprising:

means for receiving the video signal and extracting therefrom one predetermined line from a video field;

means for receiving a decrypting key and the extracted line and providing therefrom time shift data relative to the television signal;

means for processing the time shift data;

means for generating synchronization and color burst signals in response to the processed time shift data for each line; and means for receiving the video signals and also receiving the generated synchronization and color burst signals, and for removing original synchronization and color burst signals present in the video signals and substituting the generated synchronization and color burst signals at locations which are temporally misaligned by the amount of timeshifting in each line in the video signals as determined by an output of the means for processing for each line which has been time shifted.

17. A system for decrypting previously encrypted information signals to permit the use thereof, said encrypted information signals comprising encrypted versions of original information signals arranged as a succession of lines of active information, each line having a line timing reference, said encrypted signals having been produced by time shifting at least some of the lines of the original information signals with respect to the line timing reference in a predetermined manner [with the amount of time shifting in each line in the succession being different than that of the previous line], said system comprising:

means for providing an indication of the amount of time shifting performed on a given line; and means for restoring the original time relationship between the line timing reference and the line of information by using the indication of the amount of time shifting, said resorting means including means for generating a temporally misaligned line timing reference for each line which is temporally misaligned by the amount of timeshifting in the encrypted version of that line, and means for combining said temporally misaligned line timing reference with the line of information.

18. A method for encrypting original information signals to prevent unauthorized use thereof, said original information signals being arranged as a succession of lines of active information, each line having a line timing reference, the method comprising the steps of:

timeshifting the active information signal in each line relative to the line timing reference of that line, wherein the active information signal in each line is timeshifted by a predetermined [about different form the amount of timeshifting of the previous line in the succession of lines] *amount*; and inserting into the information signal an indication of the amount of time shifting;

wherein a maximum amount of timeshifting of one line relative to any other line in the succession of lines is a predetermined amount, and wherein the encrypted information signals are decryptable by a receiver, and a rate of change in the amount of time shifting between successive lines is within a capture range of synchronization circuitry in the receiver.

* * * * *